(12) United States Patent
Sridharan et al.

(10) Patent No.: US 9,373,928 B2
(45) Date of Patent: Jun. 21, 2016

(54) DIFFRACTIVE OPTICAL ELEMENTS FOR TRANSFORMATION OF MODES IN LASERS

(71) Applicant: Lawrence Livermore National Security, LLC, Livermore, CA (US)

(72) Inventors: Arun K. Sridharan, Fremont, CA (US); Paul H. Pax, Livermore, CA (US); John E. Heebner, Livermore, CA (US); Derrek R. Drachenberg, Livermore, CA (US); James P. Armstrong, Livermore, CA (US); Jay W. Dawson, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 14/797,003

(22) Filed: Jul. 10, 2015

(65) Prior Publication Data

US 2015/0340835 A1  Nov. 26, 2015

Related U.S. Application Data

(62) Division of application No. 13/791,563, filed on Mar. 8, 2013, now Pat. No. 9,124,066.

(60) Provisional application No. 61/641,464, filed on May 2, 2012.

(51) Int. Cl.
*H01S 3/10* (2006.01)
*H01S 3/067* (2006.01)
(Continued)

(52) U.S. Cl.
CPC ........... *H01S 3/10007* (2013.01); *H01S 3/0085* (2013.01); *H01S 3/06729* (2013.01); *H01S 3/10015* (2013.01); *H01S 3/10023* (2013.01); *H01S 3/10053* (2013.01); *H01S 3/1307* (2013.01); *H01S 3/2333* (2013.01); *G02B 5/1814* (2013.01); *H01S 3/005* (2013.01); *H01S 3/2383* (2013.01)

(58) Field of Classification Search
CPC . G02B 5/0273; G02B 5/1871; H01S 3/06729
See application file for complete search history.

(56) References Cited

U.S. PATENT DOCUMENTS 6,157,756 A  12/2000 Ishiwata
6,377,726 B1  4/2002 Danziger et al.
(Continued)

OTHER PUBLICATIONS

Beach, et al., "Scalable Antiguided Ribbon Laser," J. Opt. Soc. Am. B, vol. 19, No. 7, 2002, pp. 1521-1534.
(Continued)

*Primary Examiner* — Eric Bolda
(74) *Attorney, Agent, or Firm* — John P. Wooldridge

(57) ABSTRACT

Spatial mode conversion modules are described, with the capability of efficiently transforming a given optical beam profile, at one plane in space into another well-defined optical beam profile at a different plane in space, whose detailed spatial features and symmetry properties can, in general, differ significantly. The modules are comprised of passive, high-efficiency, low-loss diffractive optical elements, combined with Fourier transform optics. Design rules are described that employ phase retrieval techniques and associated algorithms to determine the necessary profiles of the diffractive optical components. System augmentations are described that utilize real-time adaptive optical techniques for enhanced performance as well as power scaling.

8 Claims, 13 Drawing Sheets

(51) Int. Cl.
| | |
|---|---|
| *G02B 5/18* | (2006.01) |
| *H01S 3/00* | (2006.01) |
| *H01S 3/13* | (2006.01) |
| *H01S 3/23* | (2006.01) |

(56) References Cited

U.S. PATENT DOCUMENTS

| | | |
|---|---|---|
| 6,985,654 B2 | 1/2006 | De Barros et al. |
| 2002/0012498 A1 | 1/2002 | Danziger |
| 2008/0219620 A1 | 9/2008 | Lindlein et al. |
| 2012/0224597 A1 | 9/2012 | Jespersen et al. |

OTHER PUBLICATIONS

Chen, et al., "Mode Converter Based on Mode Coupling in an Asymmetric Dual-Core Photonic Crystal Fibre," J. Opt A: Pure Appl. Opt., 10, 115304, 2008, pp. 1-4.

Davidson, et al., "Diffractive Elements for Annular Laser Beam Transformation," Appl. Phys. Lett., 61, 4, 1992, pp. 381-383.

Dawson, et al., "Analysis of the Scalability of Diffraction-Limited Fiber Lasers and Amplifiers to High Average Power," Optics Express, vol. 16, No. 17, 2008, pp. 13240-13266.

Fienup, "Phase Retrieval Algorithms: A Comparison," Applied Optics, vol. 21, No. 15, 1982, pp. 2758-2769.

Hergenhan, et al., "Coherent Coupling of Vertical-Cavity Surface-Emitting Laser Arrays and Efficient Beam Combining by Diffractive Optical Elements: Concept and Experimental Verification," Applied Optics, vol. 42, No. 9, 2003, pp. 1667-1680.

Ishaaya, et al., "Conversion of High-Order Mode Beam into a Nearly Gaussian Beam by Use of a Single Interferometric Element," Optics Letters, vol. 28, No. 7, 2003, pp. 504-506.

Khajavikhan, et al., "Efficient Conversion of Light From Sparse Laser Arrays into Single-Loped Far Field Using Phase Structures," Optics Letters, vol. 33, No. 20, 2008, pp. 2377-2379.

Lindlein, et al., "Achieving Gaussian Outputs from Large-Mode-Area Higher-Order-Mode Fibers," Applied Optics, vol. 46, No. 22, 2007, pp. 5147-5157.

Oron, et al., "Continuous-Phase Elements Can Improve Laser Beam Quality," Optics Letters, vol. 25, No. 13, 2000, pp. 939-941.

Ramachandran, et al., "Ultra-Large Effective-Area, Higher-Order Mode Fibers: A New Strategy for High-Power Lasers," Wiley-VCH, www.lpr-journal.org, 2008, pp. 429-448.

Siegman, "Binary Phase Plates Cannot Improve Laser Beam Quality," Optics Letters, vol. 18, No. 9, 1993, pp. 675-677.

Sridharan et al., "Mode-Converters for Rectangular Core Fiber Amplifiers to Achieve Diffraction-Limited Power Scaling," Laser Technology for Defense and Security VIII, Proc. of SPIE, vol. 8381, 2012, pp. 838103-1-838103-6.

Tunnermann, et al., "The Renaissance and Bright Future of Fibre Lasers," J. Phys. B: At. Mol. Opt. Phys., 38, 2005, pp. S681-S693.

DIFFRACTIVE OPTICAL ELEMENTS FOR TRANSFORMATION OF MODES IN LASERS

CROSS-REFERENCE TO RELATED APPLICATIONS

This is a divisional of U.S. patent application Ser. No. 13/791,563 titled "Diffractive Optical Elements for Transformation of Modes in Lasers," filed Mar. 8, 2013, incorporated herein by reference. U.S. patent application Ser. No. 13/791,563 claims the benefit of U.S. Provisional Patent Application No. 61/641,464 titled "Diffractive Optical Elements for Transformation of Modes in Lasers," filed May 2, 2012, incorporated herein by reference.

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

1. Field of the Invention

The present invention relates to fiber amplifiers, and more specifically, it relates to techniques for increasing the high average power produced by fiber amplifers.

2. Description of Related Art

Scalable, high average power lasers are needed for materials processing and defense systems. Scientific applications such as laser-based guide stars for astronomy, gravitational wave detection, coherent remote wind sensing and laser-based particle acceleration could also benefit from high-average-power lasers with diffraction-limited output radiation in a $TEM_{00}$ (lowest-order) spatial mode. Considerable attention has been focused on fiber-based lasers and amplifiers due to their potential for high average power combined with high beam quality and efficiency, compactness, and reliability.

Ytterbium doped fiber lasers and amplifiers at 1 µm have recently made tremendous progress and have been scaled to the multi-kW average power level with diffraction-limited beam quality. These systems are based on large-mode-area (LMA) step-index and photonic crystal (PC) based fiber amplifiers. The typical approach to power scaling in these fiber amplifiers is to increase the core size in each successive amplifier stage (while reducing the numerical aperture to maintain single-mode radiation), since nonlinearities and facet-damage power thresholds increase with increasing mode-field-diameter (MFD).

In typical high-power laser systems, a multi-stage optical configuration is employed, whereby a low-power, stable laser oscillator feeds one or more laser amplifier stages. Such configurations are known in the art as master oscillator power amplifier (MOPA) systems. The master oscillator, or, seed laser, typically provides high-quality diffraction-limited radiation in a fundamental $LP_{01}$ (or, $TEM_{00}$, etc.) spatial mode, which is comprised of a single-lobed output profile.

Given that a HOM, in general, is comprised of a complex, multi-lobed optical profile, a spatial mode converter is required to efficiently couple a $TEM_{00}$ mode from a seed oscillator into a desired HOM (or, superposition of HOMs) of a ribbon fiber amplifier. Similarly, since many laser applications require diffraction-limited $TEM_{00}$ output radiation, the ribbon fiber's output HOM radiation needs to be converted back to a $TEM_{00}$ mode, to complete the MOPA chain. To be of practical use, such a mode converter must be efficient (in terms of the ability to convert a $TEM_{00}$ mode into a desired HOM), low loss, and furthermore, capable of handling high optical powers, with minimal distortion and/or depolarization.

Mode conversion has recently been accomplished for circularly symmetric laser outputs via interferometric elements and mode coupling in dual-core PC fibers. However, these prior-art approaches tend to be quite complex and/or inefficient, especially, as the mode number is increased. Another conversion approach based on diffractive optical elements (DOEs) has been implemented for a number of years, for example, to transform annularly shaped output beams, typical of high-power $CO_2$ lasers, to a uniform spatial amplitude profile output, with a well-defined phase profile.

Siegman, early on, showed that for any near-field electric field profile, with a purely real-valued wave front, but with regions of positive and negative phasefront sign, a single DOE, in the form of a binary phase plate, does not improve the resultant beam quality, as measured by the well-known $M^2$ criterion. Specifically, this class of DOE mode converter results in far-field optical profiles that possess significant (undesirable) energy in its side-lobes, leading to no change in the $M^2$ figure-of-merit. Subsequently, it has been shown that mode converters comprised of either a single DOE (phase plate) or a continuous phase plate, when combined with a spatial filter can, in fact, improve the qualitative beam quality, in terms of the shape of its spatial profile, of a laser operating in a single higher-order-mode. However, in these approaches, the absolute conversion efficiency suffers, since energy in the side-lobes of the resultant beam is rejected by the spatial filter(s).

In the prior art, mode converters have been investigated to transform active optical sources into a single, composite beam. In one example of the prior art, the system was comprised of a phased array of VCSEL oscillators, whereas, in another example of the prior art the system was comprised of a sparse array of laser oscillators. In both cases, a mode converter was used to provide a $TEM_{00}$ output beam. Hence, the prior art systems demonstrated the capability to realize a free-space optical beam from an active array of devices.

A rectangular-core or elliptical-core fiber that guides and amplifies a higher-order guided mode can potentially be scaled to much higher-average-power amplification than what is possible in traditional circular-core, large-mode-area fiber amplifiers. Many applications require diffraction-limited $TEM_{00}$ output beams to be of practical use, owing to the single-lobed output profile characteristic of these guided modes. Since fiber amplifiers with higher-order mode output profiles possess multi-lobed transverse spatial profiles, systems with higher-order mode amplifiers are of limited use for many real-world scenarios, in spite of the fact that they enable scaling to much higher powers than are possible with conventional $TEM_{00}$ based fiber amplifiers. Hence, in the prior art, there is a system tradeoff regarding operation using a single-lobed, fundamental spatial mode versus power scaling considerations, typical of circularly symmetric large-core fibers.

SUMMARY OF THE INVENTION

We have theoretically analyzed the limits to power scaling of these fiber amplifiers by considering thermal, non-linear, damage and pump-coupling limits as well as fiber's MFD limitations. Our analysis shows that if the fiber's MFD could be increased arbitrarily, 36 kW of power could be obtained with diffraction-limited quality from a fiber laser or amplifier.

This power limit is determined by thermal and nonlinear limits that combine to prevent further power scaling, irrespective of increases in mode size. However, based on practical considerations for the fiber amplifiers bend diameter, we have also found that there is a practical limit to the achievable mode size; and that for this MFD there is an optimum fiber length that results in a laser whose maximum output power is 10-20 kW with good beam quality. This output power range, therefore, constitutes a practical physical limit to scaling the power of conventional fiber lasers.

Our models show that by moving from circularly-symmetric waveguides to ribbon-like rectangular-core fiber waveguides, the single-aperture power limit can be raised from 10-20 kW to >100 kW. The ribbon fiber waveguide has a rectangular cross sectional core with a high width-to-thickness aspect ratio. In such a structure the thin dimension (x) is single-moded and the wide dimension (y) is multi-moded. The fiber is coiled only in the x-direction. Since higher-order-modes (HOM) are less susceptible to bend loss and mode mixing, we choose to propagate a particular HOM (in the y-direction) in the ribbon fiber. The area of the waveguide and the mode's effective area can then be scaled by simply increasing the waveguide width. These ribbon fiber amplifiers can guide a higher-order mode, with a larger effective cross-sectional active area, and therefore, generate much higher output power than is possible in circular-core fibers.

In summary, we have discussed the design, simulation, and experimental results of mode converters with the capability to transform a fundamental ($LP_{01}$, $TEM_{00}$) output mode of a seed laser to a predetermined higher-order-mode of a rectangular-core ribbon fiber amplifier. The conversion is accomplished via two phase plates. The first phase plate is in the near field of the seed laser output beam waist and the second phase plate is in the near-field of the ribbon fiber facet. The required spatial profiles for the phase-shifting elements are derived via a Gerchberg-Saxton algorithm, for example. Phase retrieval and overlap efficiency calculations, based on experimental measurements of the intensities in the fiber-facers near and far-fields, show that the mode-conversion efficiency is ≈84%. Other phase reconstruction techniques, including genetic algorithms, have the potential to further improve the performance of the basic embodiments described herein. As discussed in "Mode-Converters for Rectangular-Core Fiber Amplifiers to Achieve Diffraction-Limited Power Scaling" 17 Dec. 2012/Vol. 20, No. 27 OPTICS EXPRESS 28800, incorporated herein by reference, we also demonstrate a mode-converter system that converts a single HOM of a ribbon fiber back to a diffraction-limited $TEM_{00}$ mode. Conversion efficiency is a record 80.5%.

Those skilled in the art will appreciate that, instead of employing a mode converter that transforms a fiber $LP_{01}$ into a single HOM (as described above), one can, alternately, design a mode converter capable of transforming an $LP_{01}$ seed beam into a superposition of HOMs that launch into the ribbon fiber amplifier. This multi-mode approach may minimize the presence of "hot spots" in the ribbon, fiber (recall that a single HOM possesses multiple lobes), by homogenizing the intensity amongst the guided modes in the fiber, which may otherwise result in undesirable nonlinear optical effects, optical damage, color-center formation, etc. Adaptive optical compensation augmentations can be used to compensate for spatial modal dispersion, resulting in a high-power, diffraction-limited system output.

The skilled artesian will also appreciate that mode converters can be designed to provide coupling of a given mode in one structure into a given mode in another, differently configured, structure. As an example, the mode-conversion technique described herein can enable the transformation of high-power optical beams to classes of Bessel-mode beams, for enhanced focal properties. Related embodiments include Raman fiber amplifiers, such as gas-filled hollow-core photonic crystal fibers, in place of solid-core ribbon fibers.

Mode conversion modules can also be utilized to enhance the performance of a broad-class of optically pumped solid-state crystalline lasers as well as optically pumped atomic vapor lasers. In the former case, side-pumped rod-based and planar based (slab) solid-state lasers can possess a significant amount of pump absorption along the edges of the crystal, resulting in a non-uniform gain profile, with a low-gain central region. Resonator designs, as well as MOPA designs, that emphasize high-quality modal output, often result in wasted (i.e., unused) stored energy in the gain medium. This follows, since a $TEM_{00}$ guided mode doesn't necessarily result in an optimal spatial overlap with an annular pump-beam absorption profile. By employing a mode converter to transform a fundamental resonator (or, amplifier) mode in a higher-order "doughnut" mode, one expects an improvement in the pump/signal spatial overlap and, therefore, the system extraction efficiency. A similar mode transformation methodology can be applied to the optical pumping of atomic vapor lasers, so that the pump absorption profiles and the laser's modal profiles can be optimally matched, resulting in enhanced laser efficiency. Finally, the use of mode converters can also, in some cases, increase the gain threshold for deleterious parasitic oscillation mechanisms.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1:
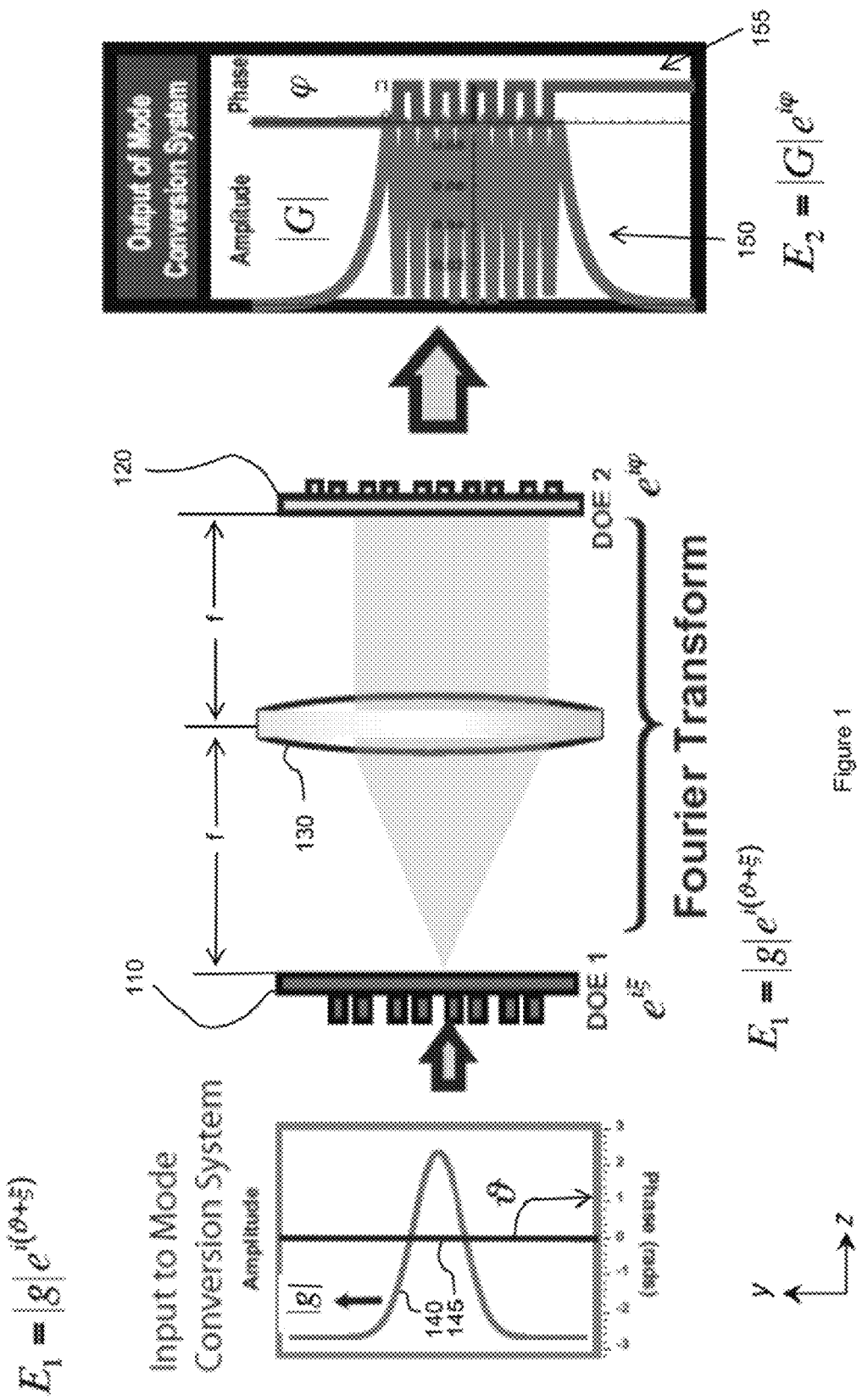
FIG. 1 depicts a basic mode-conversion system capable of transforming a $TEN_{00}$ mode to a high-order guided-wave mode, HOM (viz., a 7th order eigenmode), of a rectangular-core fiber.

In this invention, we teach embodiments that can circumvent the prior-art system design tradeoffs described in the Background of the Invention. Embodiments are presented that enable one to utilize ribbon-core fiber amplifiers, enabling high-power scaling relative to that limited by circular-core fibers, which when combined with novel spatial optical mode transformers, can efficiently convert high-order ribbon-fiber modes to $TEM_{00}$ fundamental modes, and vice versa.

The basic modal conversion, module involves a pair of diffractive-optic-elements (DOEs), situated at conjugate Fourier planes of an optical system. This configuration enables the transformation of a given input spatial profile to a specific output beam profile. As an example, a transformation module can be implemented to convert the diffraction-limited $LP_{01}$ mode from a low-power fiber laser to a specific higher-order-mode (HOM) of a ribbon core fiber amplifier, and, subsequently, from the amplified HOM ribbon-fiber exit facet to a diffraction-limited $TEM_{00}$ system output.

By extension, the final output beam can be in the form of an annular mode, which may be suitable for optically pumped laser gain media. Moreover, for specialized processing applications, the final system output can be in the form of a Bessel beam, with enhanced confocal parameters relative to a $TEM_{00}$ beam. Our experiments show that the mode-conversion-efficiency exceeds 84% and, can theoretically approach 100%, while functioning at high-power and high-energy optical levels with little or no optical distortions.

In embodiments discussed herein, mode converters are utilized to interface active guided-wave devices into one or more other active guided-wave components, such as laser oscillators to laser amplifiers. In an embodiment of the present invention, the input to a mode converter is comprised of a master laser oscillator, whereas, the output is comprised of a single ribbon fiber amplifier or an array thereof. More specifically, in an exemplary embodiment, the input field to the mode converter system is a $TEM_{00}$ beam from a low-power laser. The mode converter is designed to efficiently transform the $TEM_{00}$ beam profile into a specific higher-order eigenmode of a ribbon fiber amplifier.

A further embodiment provides the means by which the now-amplified HOM output of the ribbon fiber amplifier is subsequently transformed to a desired $TEM_{00}$ system output mode. This additional function employs a second mode converter, placed at the output facet of the fiber amplifier, with the converter comprised of a pair of DOEs similar to that of the first mode converter, but configured in a reciprocal arrangement. In both cases, the basic embodiments utilize a pair of non-identical phase plates, with each phase-plate placed at a respective conjugate Fourier plane of an optical system. In this invention, we teach designs for mode-converter systems that can theoretically approach 100% in absolute efficiency, insofar as converting $TEM_{00}$ radiation, to the ribbon fiber's HOM, and, vice versa.

Exemplary embodiments that provide enhanced performance and power scaling are presented. In the former case, various classes of real-time compensation of optical distortions are described, with the potential to provide for diffraction-limited $TEM_{00}$ output beams. In the latter case, the ability to scale the basic system to multiple ribbon fiber amplifiers, that function as a phased array, is presented. These systems have the potential to provide diffraction-limited, high efficiency operation at powers that far exceed the fundamental limitations inherent in single fiber amplifiers.

Basic Mode Conversion System

Turning now to FIG. 1, a drawing of a basic mode-conversion system is depicted. The system is comprised of a pair of diffractive optical elements, DOEs, 110 and 120, (DOE-1 and DOE-2, respectively), and a lens 130 of focal length, f. Each DOE is positioned at a respective focal plane of the lens 130, with the lens situated at the mid-plane between the pair of DOEs. The input optical beam to the system, $E_0 = |g|e^{i\theta}$, is a complex electromagnetic field, characterized by an amplitude ($|g|$) 140 and a phase ($\theta$) 145. The optical axis of the system is oriented along the z-direction, as shown. Upon propagation of the beam through phase-plate (DOE-1) 110, a spatial phase profile, $\xi(y)$, is imposed into the incident field $E_0$, resulting in a field $E_1 = |g|e^{i(\theta+\xi)}$ at the front (upstream) focal plane of lens 130. (For convenience, we drop the explicit y-dependence notation of the amplitude and phase functions; it is to be understood that all such functions possess a transverse spatial dependence.)

In the case of an incident field whose beam waist is located at the plane of DOE-1, the initial input phase 145 is uniform. Hence, $\theta = 0$, corresponding to the case of a fundamental spatial mode, with $E_1 = |g|e^{i\xi}$. Upon propagation through the lens 130, the resultant EM field at the rear focal plane of lens 130 is given as $E_2 = |G|e^{i\phi}$, with an amplitude ($|G|$) 150 and a phase ($\phi$) 155. Assuming that the system satisfies the Fraunhofer approximation, it is well known that the complex EM fields at the respective focal planes of lens 130 are proportional to the spatial Fourier transforms of one another. That is $E_2 \propto \mathcal{F}\{E_1\}$, where $\mathcal{F}$ is the Fourier transform operator.

In the design of a passive mode converter the respective amplitudes, $|g|$ and $|G|$, of the respective input and output beams, 140 and 150, are either known or specified. It is a goal of this invention, therefore, to determine the necessary phase functions, $\xi$ and $\phi$, so that the mode converter will transform the given input amplitude 140 into the given, output amplitude 150 with high efficiency and, furthermore, with a high optical throughput (i.e., low loss). Once phase functions ξ and φ are determined, the respective DOEs will be fabricated to impose these respective phase maps onto the incident and output beams, via the respective transmission coefficients, $e^{i\xi}$ and $e^{i\phi}$, as shown in FIG. 1.

Since the respective optical fields, $E_1$ and $E_2$, at the respective planes containing DOE-1 and DOE-2, are related via a spatial. Fourier transform, it is possible to use various classes of phase retrieval computational methods to ascertain the necessary phase profiles, ξ and φ, at the two planes. In this manner, the respective DOEs can be fabricated, each with the respective phase-plate profile, ξ and φ, that results in a self-consistent solution.

For the purposes of simulations and experimental demonstrations, and, without loss of generality, we consider the implementation of a mode-conversion module that enables high-efficiency coupling of a single-mode fiber laser oscillator output beam to a specific HOM of a fiber power amplifier. As discussed in more detail below, the ribbon fiber amplifier is fabricated so that a single spatial mode exists along one of the cross-sectional dimensions (the x-axis), and, that a higher-order mode (HOM) exists along the orthogonal cross-sectional dimension (the y-axis). In one example, the HOM of the fiber amplifier, to which one desires to launch the seed laser output, is chosen to be the $7^{th}$ order eigenmode of a rectangular-core fiber (i.e., a ribbon fiber).

Figure 2:
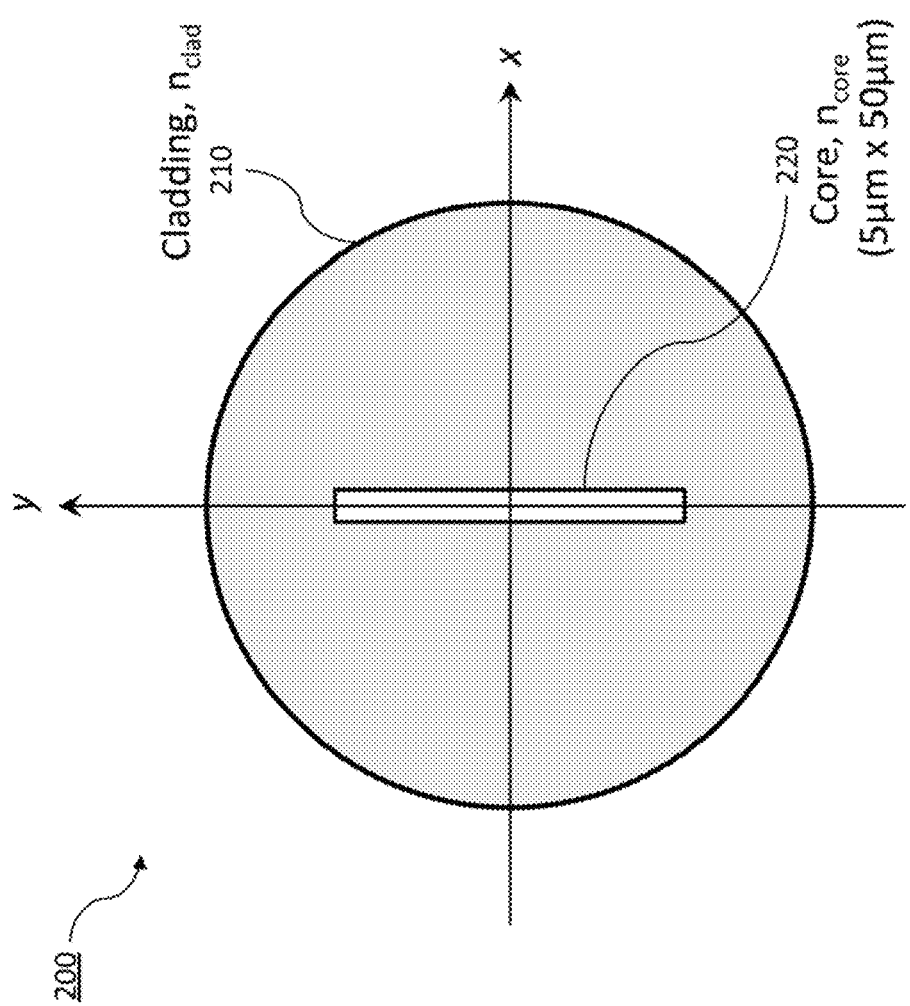
FIG. 2 shows a cross-section of a ribbon fiber facet comprised of a rectangular core whose width is 5 μm and length is 50 μm.

FIG. 2 shows an example of a step-index ribbon fiber 200 wherein the refractive index of the cladding, $n_{clad}$, 210 is slightly smaller relative to the refractive index of the rectangular core, $n_{core}$, 220, or, guiding region. In this example, the cross-sectional dimension of the guiding region 220 is 5 μm in the x-direction and 50 μm in the y-direction. For this choice of dimensions and refractive indices, the guided spatial mode is assumed to be a single mode in the x-direction and the desired. HOM on the ribbon fiber is assumed to be the $7^{th}$ order spatial mode in the y-direction.

Phase Retrieval via Gerchberg-Saxton Algorithms

The prior art includes various mathematical algorithms with the capability to determine the phasefront (or, wavefront) profile of a complex electromagnetic field at a given pair of planes in space, given the respective amplitudes of the field (i.e. the magnitude of the complex field) at the respective planes. The general technique is commonly referred to in the art as "phase retrieval." One such mathematical construct is known in the art as the Gerchberg-Saxton (G-S) algorithm, which is utilized in the design rules for the mode-converter described herein.

The G-S algorithm involves an iterative process that enables one to determine the phase profiles of a field, at two different planes in space, given the amplitudes of the given field at the two said planes. We shall assume that the functions involved are well-behaved in a mathematical sense and that the iterative process converges to a single stable state. Typically, the two specified planes in space are related by a Fourier transform (e.g., the near-field and the far-field locations). Under these conditions, the G-S algorithm proves a means for phase retrieval of the field, in a self-consistent manner.

In the context of this invention, it is assumed that a pair of optical field amplitudes is specified, with the goal to determine the phase map of each field, at their respective Fourier transform planes, that results in an self-consistent iterative solution. Suffice it to say, the criteria for convergence of the algorithm has various interpretations, such as, meeting or exceeding a predetermined threshold in terms of the correlation, overlap integral or other comparative metric that compares the $n^{th}$ iteration with the $(n+1)^{th}$ iteration.

Figure 3:
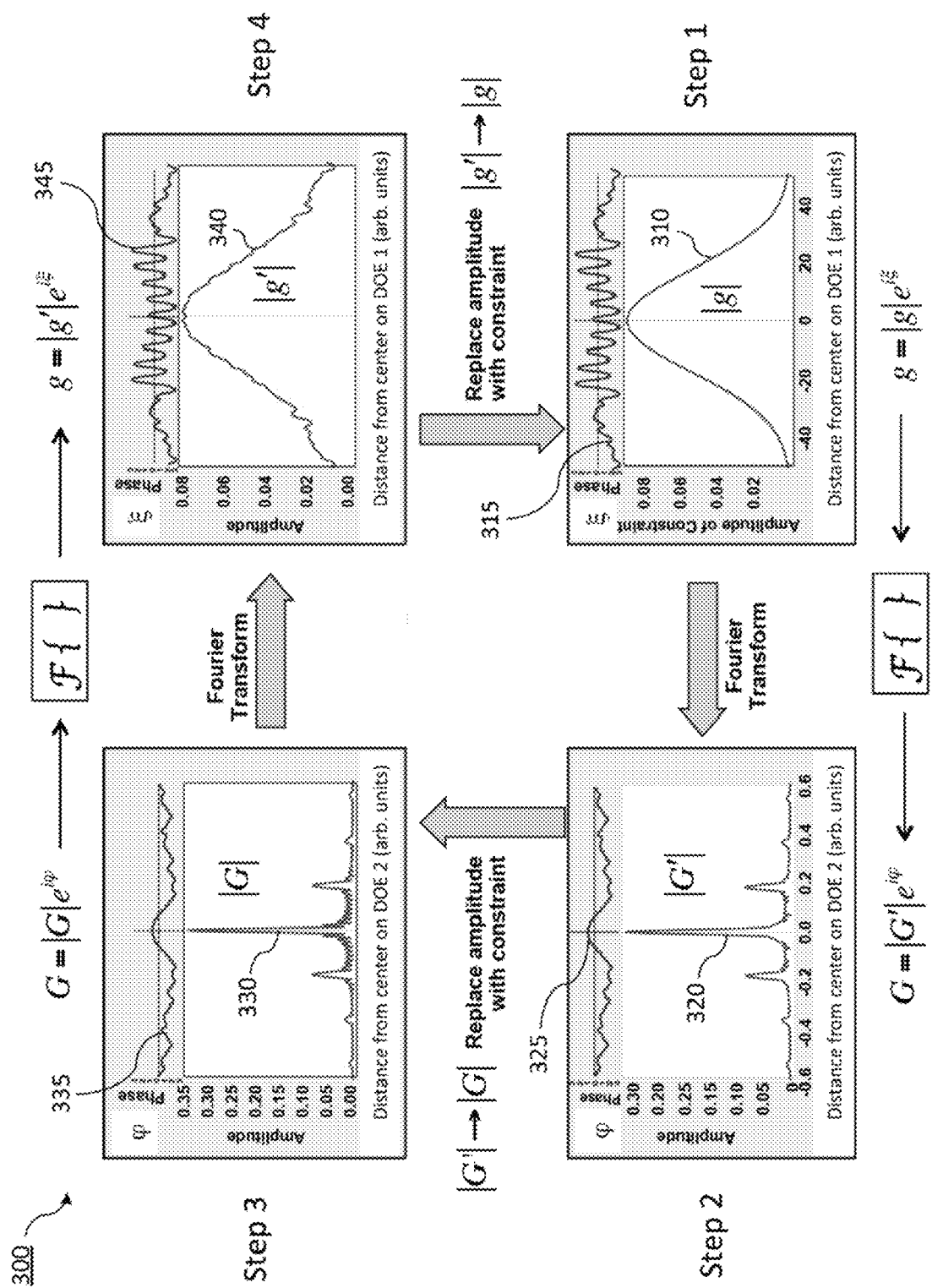
FIG. 3 shows a functional flow chart depicting the operations typical of a Gerchberg-Saxton phase retrieval algorithm.

There are myriad variants on prior-art G-S algorithm. Referring to FIG. 3, a flow chart, 300, depicting one variant of G-S is shown. In this approach, there are two constraints, namely, the amplitude of an EM field at each conjugate transform plane. The corresponding phase map of each electromagnetic (EM) field at its respective transform plane is allowed to vary freely, subject to the iterative system satisfying the pair of transform-related constraints. In what follows, we assume that the slowly varying envelope of the EM wave is a complex quantity, comprised of an amplitude and a phase function, and, further, that the field is monochromatic.

In this example, the starting point of the G-S algorithm corresponds to specifying the amplitude in the near-field output plane of the single-mode fiber oscillator. The near-field intensity is given by $|g|^2$; the far-field intensity is given by $|G|^2$, which, for future reference, also corresponds to the near-field of the ribbon fiber amplifier; and the Fourier transform of g is given by G, thereby forming a conjugate pair of transform variables. Hence, the respective field amplitudes, $|g|$ and $|G|$, form the two constraints. Turning now to FIG. 3, and, given these definitions and constraints, the four-step G-S iterative approach is implemented as follows:

Step 1: The amplitude of the BM field, $g=|g|e^{i\xi}$, at DOE-1 (recall, FIG. 1), is constrained, to be a specific function, $|g|$, 310, whereas, the phase, ξ of the field 315 is unconstrained. The phase will tend to a self-consistent function upon convergence of the algorithm. In this case, the initial amplitude 310 is constrained to be the desired near-field single-mode ($LP_{01}$ or $TEM_{00}$) output of the seed (master) oscillator.

Step 2: The complex field, $g=|g|e^{i\xi}$ is spatially propagated, from the plane containing DOE-1, 110 (located at the front focal plane of the lens 130, as shown in FIG. 1), through the lens 130 and, finally, evaluated at the rear focal plane of the same lens, namely, at the plane containing DOE-2, 120. In the Fraunhofer approximation, which is applicable for these practical systems, it is well-known that the EM complex field at the rear focal plane of a lens will be proportional to the spatial Fourier transform of the incident field at the front focal plane, that is, $G \propto \mathcal{F}\{g\}$, where $\mathcal{F}$ is the spatial Fourier transform operator. The resultant complex field, $G=|G'|e^{i\Phi}$, at the rear focal plane is comprised at an amplitude, $|G'|$, 320 and a phase function (φ) 325.

Step 3. The resultant Fourier-transformed amplitude ($|G'|$), 320 is replaced by the fixed amplitude function ($|G|$) 330. In the context of the mode converter, $|G|$ corresponds to the desired HOM amplitude of the desired ribbon fiber amplifier eigenmode. Hence, the complex field $G=|G'|e^{i\Phi}$ becomes $G=|G|e^{i\Phi}$. Recall, that this field amplitude is the second of the two constraints inherent in the G-S algorithm. The phase function (φ) 325, as determined by the Fourier transform operation of Step 2, is unconstrained, as shown by the phase function 335.

Step 4. The complex field, $G=|G|e^{i\Phi}$, is then spatially propagated, from its position at DOE-2, 120, that is, the rear focal plane of the lens, back through the lens 130 and, finally, evaluated at the front focal plane of the same lens, namely, at the plane containing DOE-1, 110. The lens 130 generates the Fourier transform of the complex field, $G=|G|e^{i\Phi}$, resulting in a field $g=|g'|e^{i\xi}$ at DOE-1. The EM field $g=|g'|e^{i\xi}$ is comprised of amplitude ($|g'|$) 340 and phase function (ξ) 345, respectively. The final operation of this initial iteration involves replacing the amplitude ($|g'|$) 340 with the amplitude ($|g|$) 310 at the plane containing the element DOE-1. This amplitude ($|g|$) corresponds to the first constraint of the G-S algorithm, as indicated in Step 1 above. As before, the phase function (ξ) 345 is unconstrained, as shown by 315. This completes the first iteration of the phase retrieval algorithm.

The resultant complex field, $g=|g|e^{i\xi}$, is then Fourier transformed again, and, the four-step sequence of operations repeats, until a predetermined convergence condition is satisfied. As an example, the convergence condition can entail that the correlation of the complex field (at a given plane) upon iteration n and upon iteration n+1 be greater than a specified threshold, the value of which is dependent on the end-user application. Throughout the iterative process, the phase functions 315 and 335 ($\xi$ and $\phi$, respectively) are unconstrained, with the converged phase functions determining the required phase plate spatial profiles for DOE-1 and DOE-2, respectively.

Note that the G-S algorithm can proceed in a different order of steps, depending upon the end-user's preference. As an example, to design a mode converter that transforms the HOM of a ribbon fiber to a fundamental mode (e.g., $TEM_{00}$), the sequence of operations depicted in FIG. 3 would become ordered as Steps 3-4-1-2. That is, initially, in Step 3, the HOM constraint (|G|) 330 is first specified; followed by a Fourier transform, resulting in Step 4; at which point, the seed fiber oscillator amplitude constraint (|g|) 310 replaces the transformed amplitude (|g'|) 340 as depicted in Step 1. This is followed by a Fourier transform, resulting in Step 2; at which point, the HOM amplitude constraint (|G|) 330 replaces the transformed amplitude (|G'|) 320, completing the first iteration, with the sequence repeating. As before, the phase functions 315 and 335 ($\xi$ and $\phi$, respectively) are unconstrained, with the converged phase functions determining the required phase plate spatial profiles, DOE-1 and DOE-2, respectively. In the experiments discussed below, the threshold condition was set to 97%, implying that the normalized overlap integral that characterizes the goodness of the iterative process is close to unity.

5. Mode-Converter Design and Simulation

Returning to FIG. 1, the input plane (corresponding to the location of DOE-1) of the mode conversion system is assumed to be situated at the near-field plane (or, an image relay plane thereof) of the seed laser output beam, whereas the output port of the mode conversion system is situated at the near-field plane of the input to the ribbon fiber (or, an image relay plane thereof). Without loss of generality, we assume that the optical beams are monochromatic and possess a single polarization state. Hence, a scalar representation of the optical fields can be utilized. Moreover, we assume that the ribbon fiber is of a single-mode in the orthogonal direction, thereby reducing the system design to a one-dimensional model.

As discussed above, a mode converter that transforms a $TEM_{00}$ (or, a $LP_{01}$) mode to a given multi-lobed higher-order-mode (HOM) must redistribute the energy from a Gaussian profile (typical of a fundamental mode) to a HOM profile with multiple-lobes in the transverse direction. Another necessary condition is that the phase-front of the HOM is characterized by a spatial phase profile that alternates between 0 and $\pi$ radians that correlates with the multi-lobe amplitude profile. Accomplishing these two tasks necessitates two diffractive-optic-elements (i.e., phase-only plates; one for each task) as illustrated in FIG. 1. The first phase plate, DOE-1 110, steers and reshapes the input Gaussian profile 140 to generate an appropriately scaled, multi-lobed amplitude profile 150 that corresponds to a given higher-order guided-mode of the ribbon fiber, which is positioned at the plane of the second phase plate, DOE-2 120. The second phase plate, in turn, imposes the requisite amount of phase shift across the wavefront, 155, to achieve multiple lobes whose phase alternates between 0 and $\pi$.

By placing the first phase plate (DOE-1) 110 at the waist of the input mode, we ensure that incident beam's phase-front is flat, which is characteristic of the fundamental mode of the seed fiber oscillator. The second phase plate (DOE-2) 120, in turn, is placed in the conjugate Fourier plane with respect to the first phase plate. As noted above, the system is configured so that the location of second phase plate (DOE 2) along the optical axis coincides with the near-field of the ribbon fiber amplifier input plane.

Figure 4:
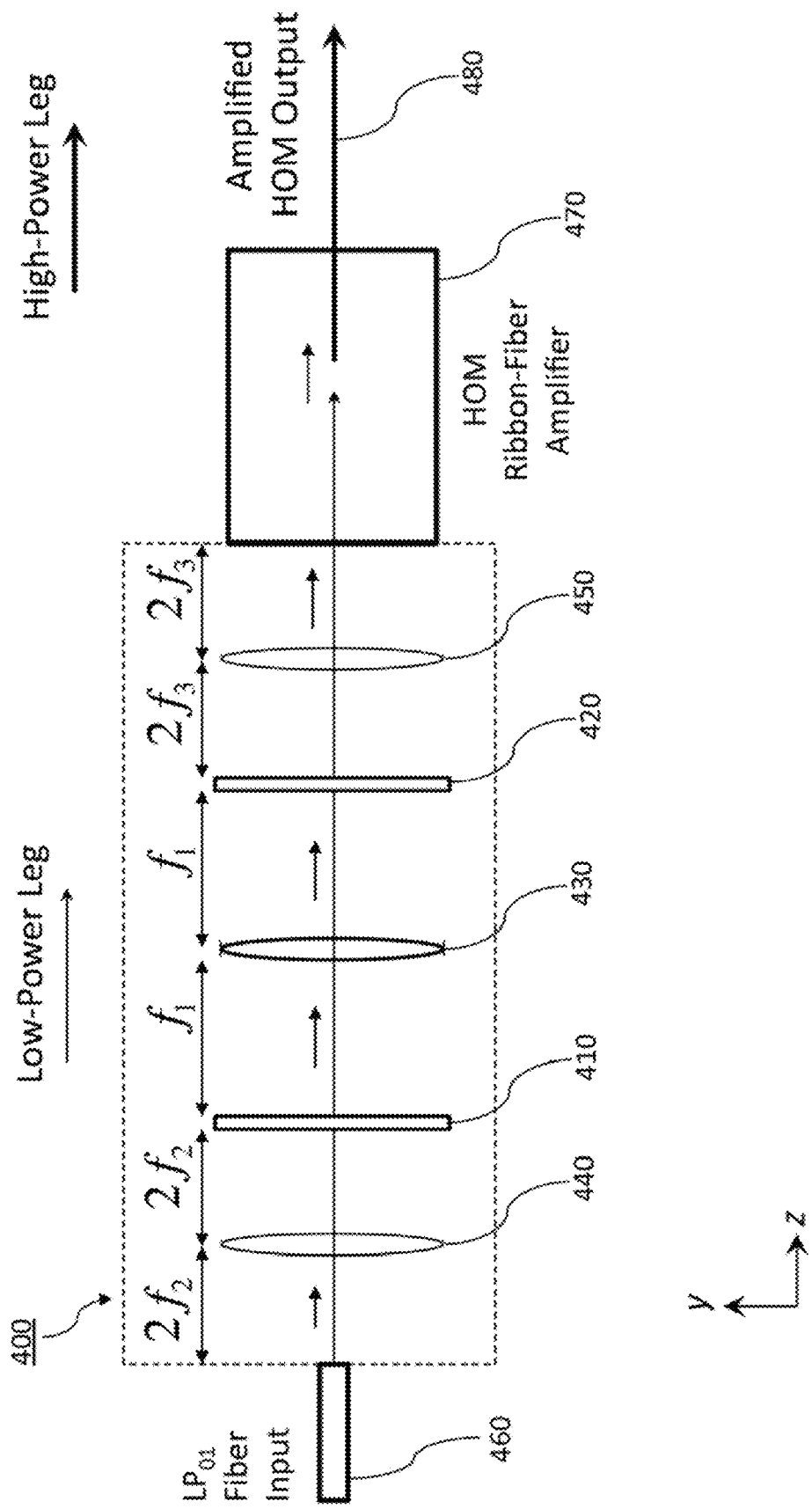
FIG. 4 shows a single-pass laser system using a mode converter to transform a fundamental mode of a fiber laser ($LP_{01}$) into a specific high-order mode of a ribbon fiber amplifier.

Turning now to FIG. 4, a single-pass MOPA system implementation is shown in which a mode converter module is used to enable efficient coupling of a low-power master oscillator into a high-power ribbon fiber amplifier. The basic system is comprised of a single-mode fiber seed laser 460, which is assumed to provide a diffraction-limited $LP_{01}$ output beam. The power amplifier stage, in this example, is comprised of a ribbon-fiber amplifier 470. For this simulation, the fiber amplifier cross section is similar to that depicted in FIG. 2. The ribbon-fiber is oriented in FIG. 4 so that the y-axis lies in the plane. The laser beam propagates along the z-axis, corresponding to the optical axis of the system. The same coordinate system convention is employed in all subsequent system diagrams herein.

A mode converter module 400 is used to efficiently convert the $LP_{01}$ input beam into a desired higher order mode (HOM), which is launched into the ribbon amplifier 470. The amplified output beam 480 exits from the downstream facet of the fiber amplifier.

The basic mode converter module 400 is comprised of a pair of DOEs, 410 and 420, separated along the optic axis by a distance, $2f_1$, with a Fourier transform lens 430 placed at the mid-plane. This triplet is similar to the basic module shown in FIG. 1, with the respective elements 110, 120 and 130.

The system 400 is further comprised of a pair of relay lenses, 440 and 450, of focal lengths, $f_2$ and $f_3$, respectively. Relay lens 440 is used to image the near-field of the seed laser output plane to the upstream diffractive element DOE-1 410, whereas relay lens 450 is used to image the downstream diffractive element DOE-2 420 (which also corresponds to the far-field of the seed laser output plane) to the near-field input plane of the ribbon-fiber amplifier 470.

Recall, from FIG. 2, we use the 7th eigenmode of the ribbon fiber i.e., a rectangular 5 μm×50 μm silica core with 0.1 NA and circular cladding), which has 7 lobes along the width of the core. As is well-known for this HOM, the phase of each lobe is 0 or $\pi$. Since the rectangular effective waveguide is designed to possess a single mode in the x-direction, in this dimension, the eigenmode can be transformed to the appropriate size using cylindrical lenses. Using the G-S algorithm in 1-D, we solve the phase profiles of the two DOEs that transform a diffraction-limited Gaussian profile to the ribbon fiber's higher-order eigenmode.

Figure 5D:
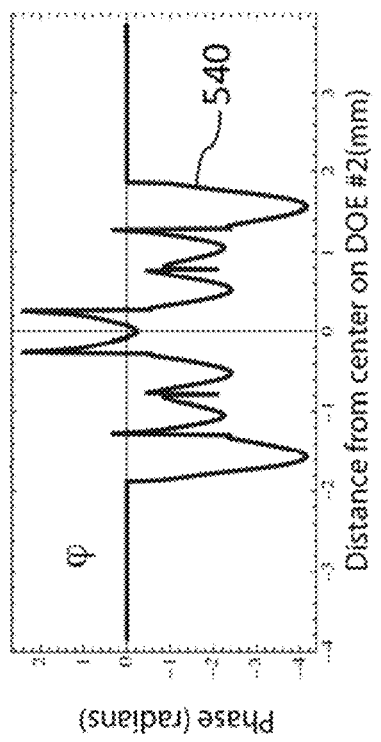
FIG. 5D shows simulation results, which yield a phase profile (associated with the field amplitude in FIG. 5B), as determined via a phase retrieval algorithm, in the design of a mode converter.
Figure 5B:
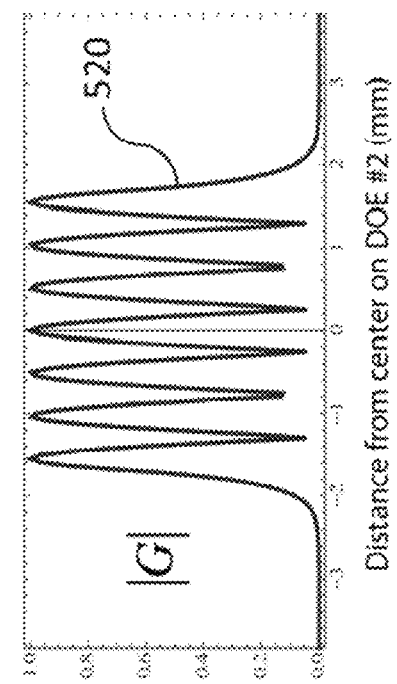
FIG. 5B depicts the amplitude of a high-order mode, defining the second of two constraints used in the simulation and design of a mode converter.
Figure 5C:
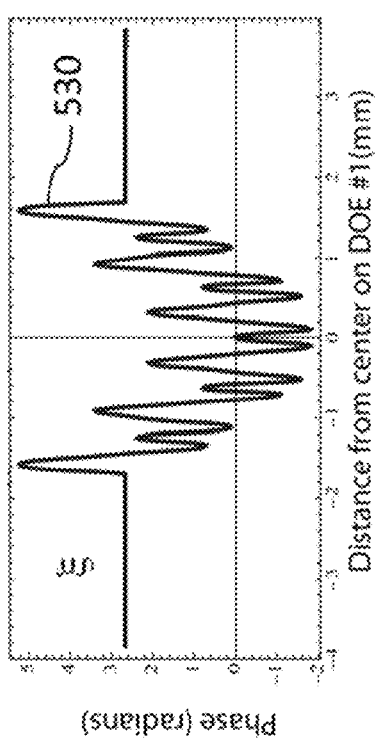
FIG. 5C shows simulation results, which yield a phase profile (associated with the field amplitude in FIG. 5A), as determined via a phase retrieval algorithm, in the design of a mode converter.
Figure 5A:
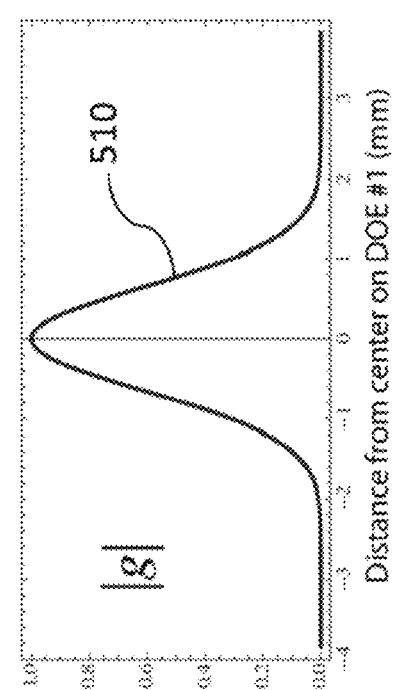
FIG. 5A depicts the amplitude of a low-order mode, defining one of two constraints used in the simulation and design of a mode converter.

FIGS. 5A through 5D show results of the G-S algorithm, subject to the constraints noted above. Specifically, one constraint, is the near-field amplitude (|g|) of the seed laser output 510, as shown in FIG. 5A, whereas, the second constraint is the near-field amplitude (|G|) of the $7^{th}$ order HOM of the ribbon-fiber amplifier 520, as shown in FIG. 5B. These amplitudes correspond to the magnitude of the EM fields incident on DOE-1 and DOE-2, respectively. The G-S result for the phase-unwrapped profile ($\xi$) 530 for the field incident on DOE-1 is shown in FIG. 5C, whereas, the phase-unwrapped profile ($\phi$) 540 for the field incident on DOE-2 is shown in FIG. 5D. Note that DOE-1 has a phase-excursion that spans approximately 1.5 waves. This phase plate essentially steers and reshapes the Gaussian input profile to achieve multiple-lobes in the plane of DOE-2. On the other hand, DOE-2 imposes a periodic, binary phase-flip profile between 0 and π that alternates across the seven lobes of the HOM ribbon-fiber eigenmode, as expected from guided-mode symmetry considerations. For this simulation, the modal conversion efficiency is theoretically nearly 97% and is limited primarily by numerical errors.

Experimental Results

Figure 6:
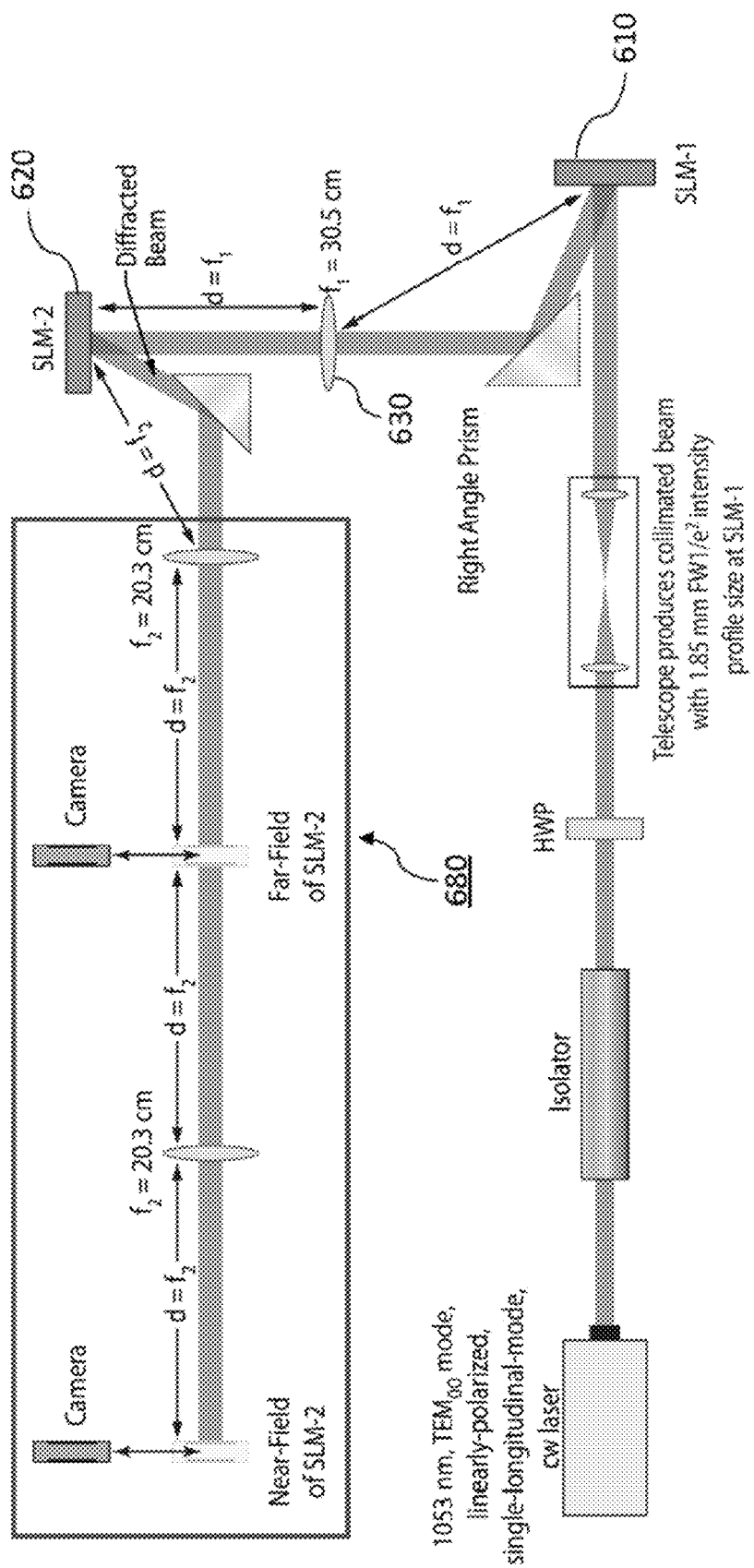
FIG. 6 shows an experimental setup of a mode-converter system that uses two spatial light modulators, as programmable diffractive optic elements, to impose the required phase profiles onto a propagating mode at a pair of Fourier conjugate planes.

FIG. 6 shows an experimental layout of a mode-converter, which uses a pair of computer-controlled, phase-only spatial, light modulators, SLMs, to emulate a pair of diffractive optic elements (DOEs), as required for the system (recall, FIGS. 4; 410 and 420). The key components of the test-bed include the pair of SLMs, SLM-1 (610) and SLM-2 (620), and a transform lens 630, of focal length $f_1$, situated at the mid-plane between the SLMs (spaced apart by $2f_1$ along the optic axis). The experimental apparatus also includes a diagnostic module 680 that provides video monitoring of the near-field and far-field system outputs, along with auxiliary optical components, including a laser, optical isolator and beam-forming optics. (The auxiliary components are not fundamental to the results and, hence, will not be discussed further.)

For this demonstration, the phase profiles imposed upon the respective SLMs were similar to those determined in the previously described simulation, as shown in FIG. 5C (530) and FIG. 5D (540), respectively. The test-laser's output is collimated and magnified to a size that is appropriate for incidence upon SLM-1. The diffracted output is picked-off by using a right angle-prism and imaged onto SLM-2. The diffracted output of SLM-2 is again picked-off with another prism.

Figure 7A:
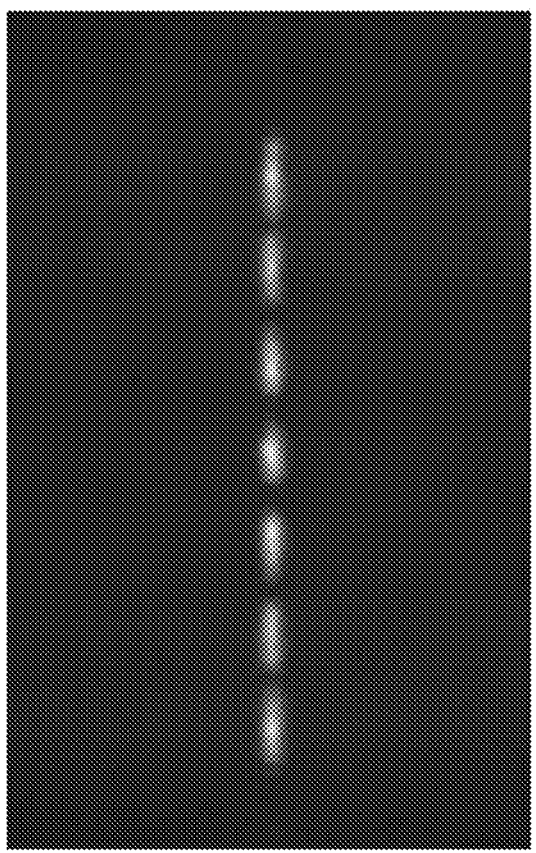
FIG. 7A shows a camera image of the far-field intensity of SLM-2 using the apparatus shown in FIG. 6.
Figure 7B:
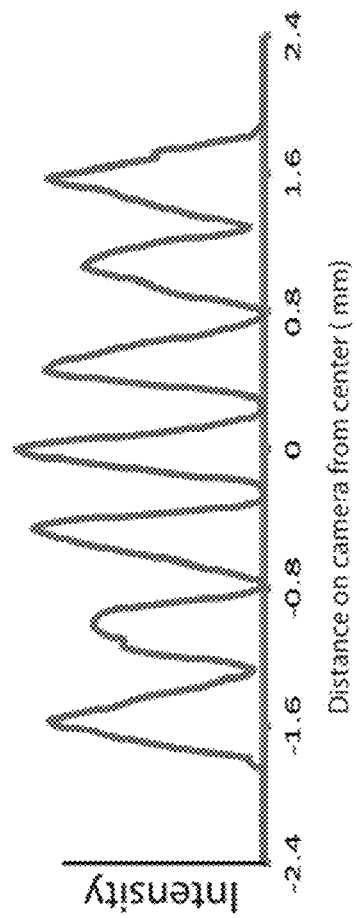
FIG. 7B shows a camera image of the near-field intensity of SLM-2 using the apparatus shown in FIG. 6.
Figure 7C:
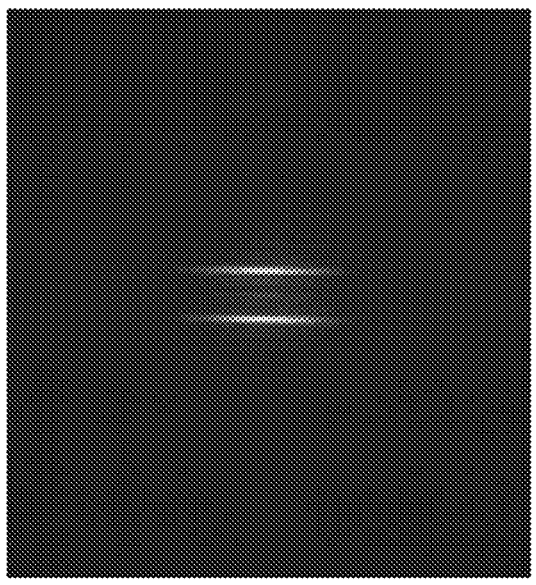
FIG. 7C shows a line-scan profile of the far-field intensity of SLM-2 using the apparatus shown in FIG. 6.
Figure 7D:
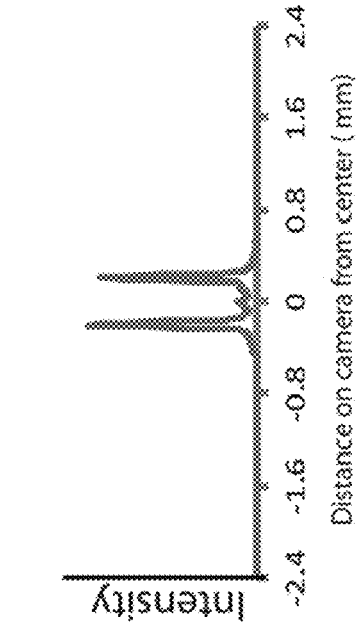
FIG. 7D shows a line-scan profile of the near-field intensity of SLM-2 using the apparatus shown in FIG. 6.

The resulting far-field and near-field intensities are measured using standard CCD cameras, with the video data shown in FIGS. 7A through 7E). FIGS. 7A and 7B show the recorded camera images at the two Fourier planes, or, equivalently, the far-field and the near-field of SLM-2, respectively. FIGS. 7C and 7D show a line scan profile, taken across the respective far-field and near-field images.

Figure 8A:
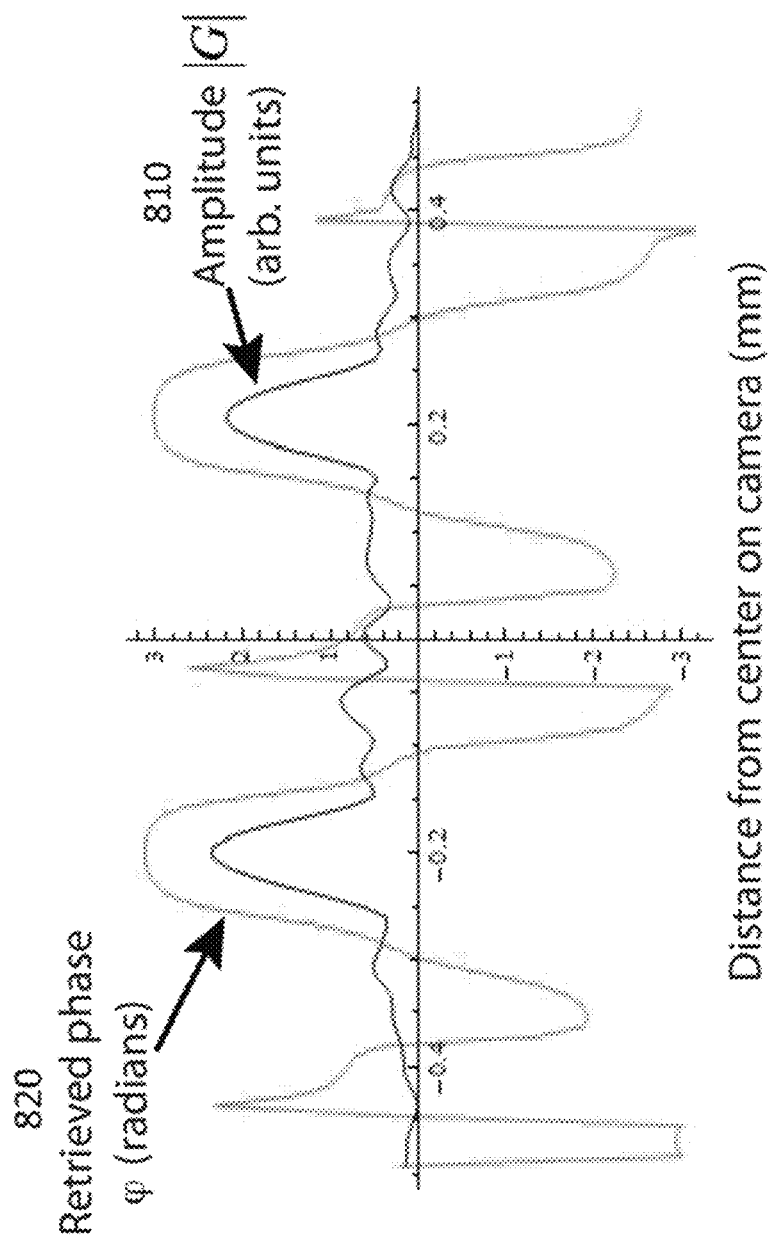
FIG. 8A shows a calculation of the field amplitude and the retrieved phase profile, corresponding to the experimentally measured intensity profile in the far-field of SLM-2, as shown in FIG. 7C.
Figure 8B:
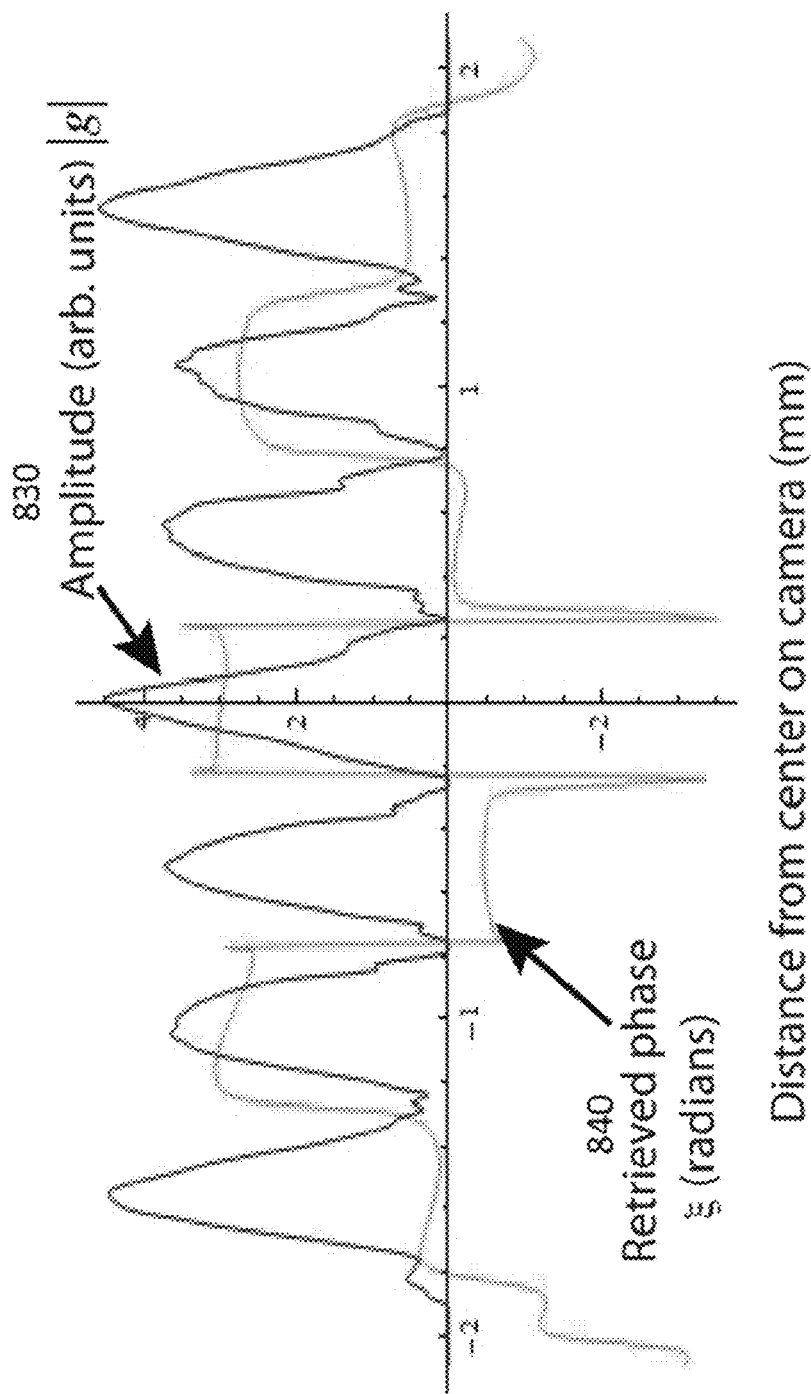
FIG. 8B shows a calculation of the field amplitude and the retrieved phase profile, corresponding to the experimentally measured intensity profile in the near-field of SLM-2, as shown in FIG. 7D.

FIG. 8A and FIG. 8B show the respective calculated far-field and near-field amplitudes and phase profiles, referenced to the plane containing SLM-2. These results are all derived from the measured far-field and near-field intensities recall the data shown in FIGS. 7A through 7D). Shown in FIG. 8A is the far-field amplitude 810, as calculated using the measured far-field intensity; and, the far-field phase profile 820, as retrieved by the G-S algorithm. The similarly derived near-field amplitude 830 and near-field phase profile 840 are shown in FIG. 8B.

As expected, the near-field amplitude profile (830) in FIG. 8B is comprised of a 7-lobed structure, which is to be compared against the constraint used in the simulation (520), as shown in FIG. 5B. The overlap integral of the experimentally derived field (830) with that used in the simulation (520) for the ribbon fiber's 7th eigenmode is 84%, which is to be compared against a predicted value of 97%. In terms of the experimental apparatus, the conversion efficiency is limited, to a certain extent, by the uncertainty in determining the precise location of the Fourier-planes along the optical axis, the optical quality of the Fourier transform lens, as well as by the finite spatial bandwidth of the SLMs, the latter of which, in the face of large phase jumps across pixels, results in systematic high-frequency spatial ripples in the near-field, with a concomitant reduction in conversion efficiency. In terms of the phase retrieval computation, the goodness of the derived phase profiles can be systematically affected by the convergence properties of the G-S algorithm. Nevertheless, the measured correlation of 84% compares favorably against the value of 97%, as predicted by our model.

MOPA System Embodiments

Figure 9:
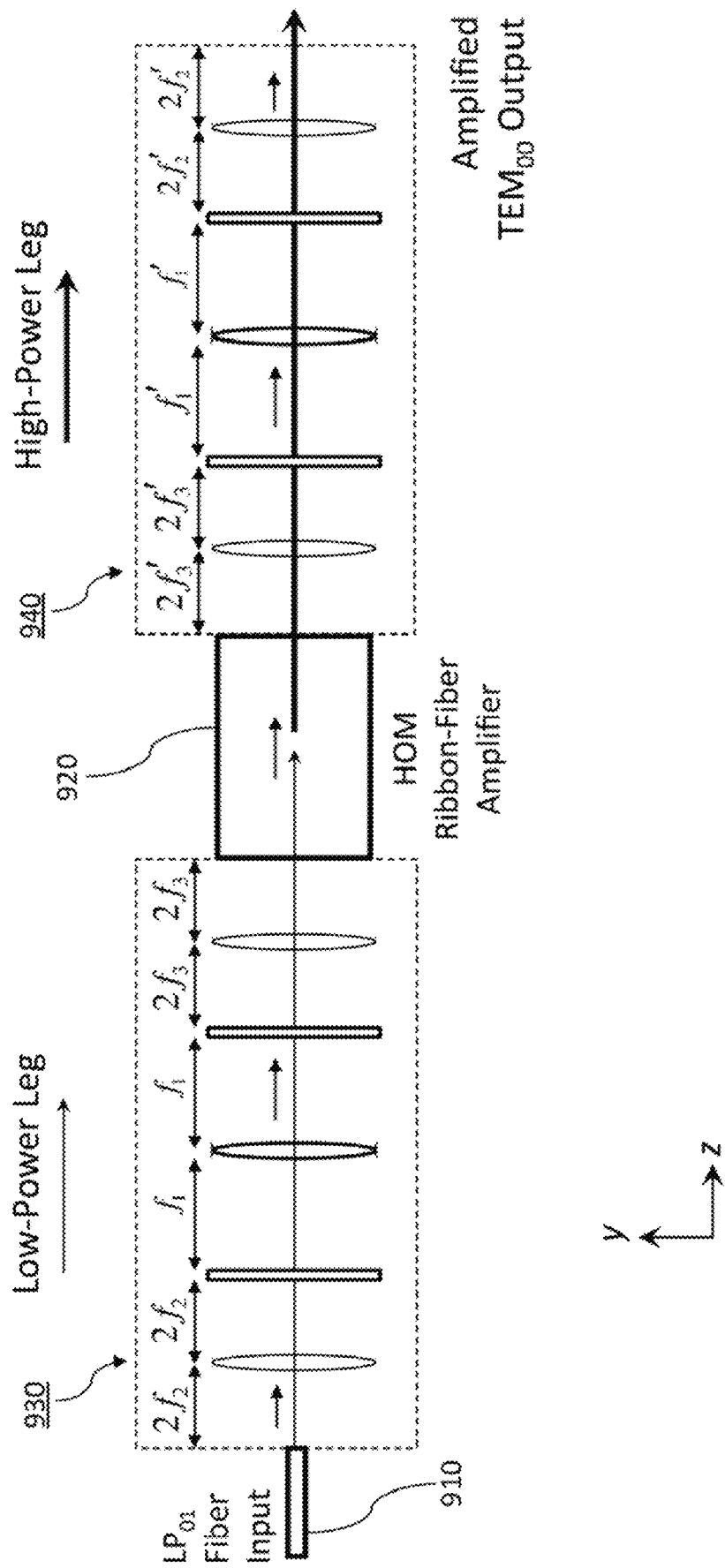
FIG. 9 depicts a single-pass MOPA system embodiment using a mode converter to transform a fundamental mode of a fiber laser ($LP_{01}$) into a specific high-order mode of a ribbon fiber amplifier, also, and a second mode converter to transform the HOM output of the ribbon fiber amplifier to a $TEM_{00}$ mode.

Turning now to FIG. 9, a Master Oscillator Power Amplifier (MOPA) system, capable of providing a $TEM_{00}$ output mode, is shown. This system utilizes two mode converters. One mode-converter, 930 positioned in the low-power leg of the system, is used to enable efficient coupling of a fiber seed laser 910, assumed to operate in a single mode ($LP_{01}$) into a desired HOM of a ribbon fiber power amplifier 920. A second mode converter 940, positioned in the high-power leg of the system, is used to enable efficient mode conversion from the HOM output of the ribbon fiber amplifier into a desired final output beam, which, as an example, can be designed to be a $TEM_{00}$ mode. The mode converters 930 and 940 are similar in design relative to that described previously (400) with respect to FIG. 4, with the second module (940) essentially functioning in reverse, by reciprocity, with respect to the first module (930).

Figure 10:
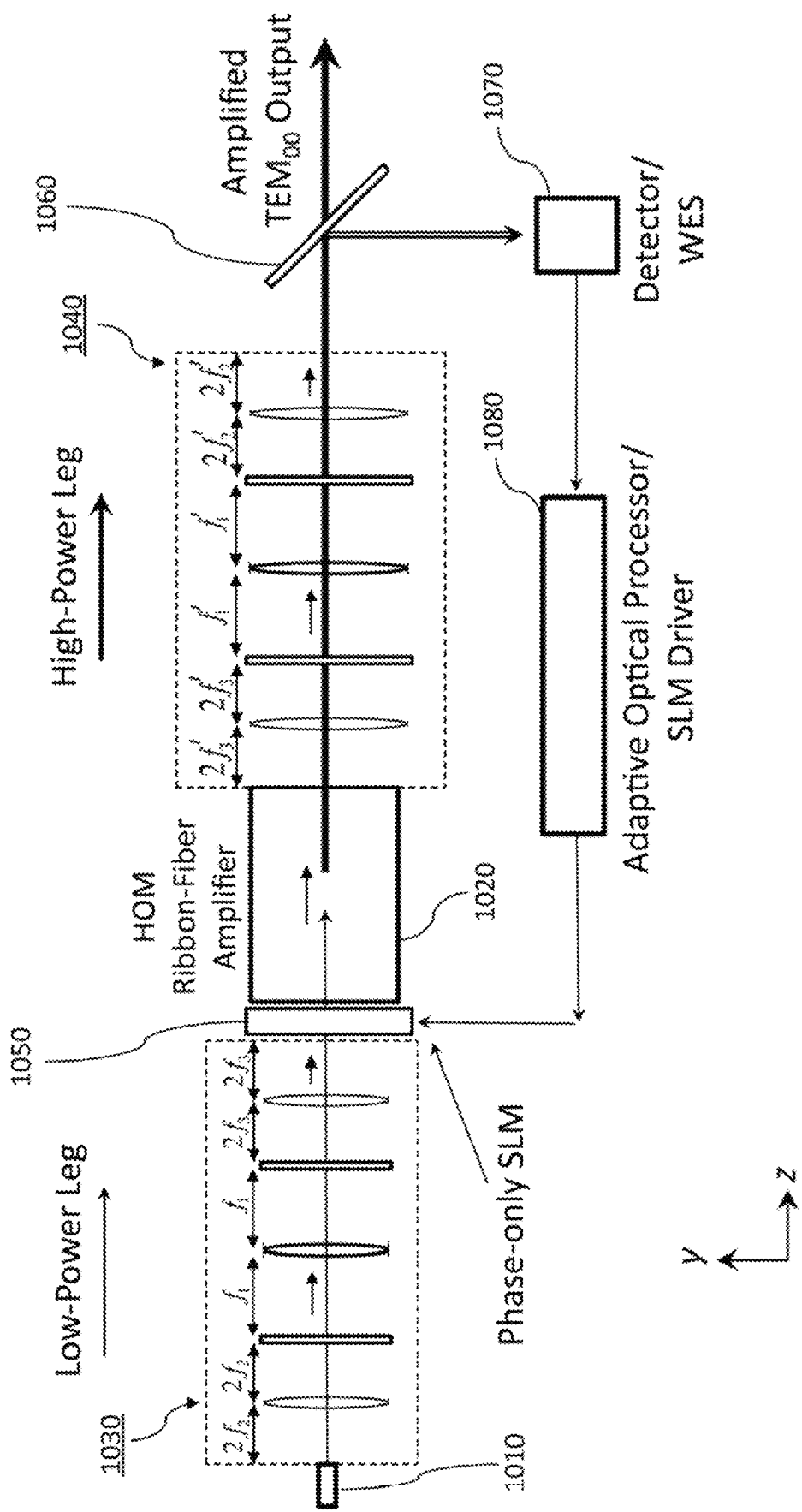
FIG. 10 shows the single-pass MOPA system of FIG. 9, augmented with a real-time adaptive optical correction subsystem.

Turning now to FIG. 10, an embodiment similar to the single-pass MOPA configuration described in FIG. 9, is shown. In this case, the system is augmented with a means by which to actively compensate for fixed and/or dynamically varying optical distortions within the components. Examples of static aberrations include deviations from ideal HOM operation and/or modal preservation of the desired mode in the ribbon fiber amplifier (due to imperfections, dimensional variations, scattering, etc.). Dynamic distortions can include mechanical and thermal perturbations of the fibers, life-cycle degradation of the active media, etc. Since the mode converters are designed assuming a well-defined, stationary HOM spatial profile in the ribbon fiber, deviations from such will result in a loss of efficiency, since the converter is essentially a fixed matched filter.

Returning to FIG. 10, the compensated MOPA system is comprised of a pair of mode converters 1030 and 1040, a seed laser 1010, and a HOM ribbon fiber power amplifier 1020. Real-time adaptive optical compensation is achieved by sampling a fraction of the output spatial profile, via beam splitter 1060 and detector/wavefront error sensor 1070, reconstruction of the phasefront, via processor 1080, and a phase-only SLM 1050. Since the SLM is in the low-power leg of the system, optical power-handling issues are circumvented, enabling the use of a variety of low-power handling devices. Using conventional servo-loop control techniques and/or genetic algorithm processing, a feedback error-correcting (spatially encoded) signal is imposed onto the SLM to drive the wavefront errors to zero (ideally). In this manner, the amplified output beam can approach that of a diffraction-limited $TEM_{00}$ mode.

Figure 11:
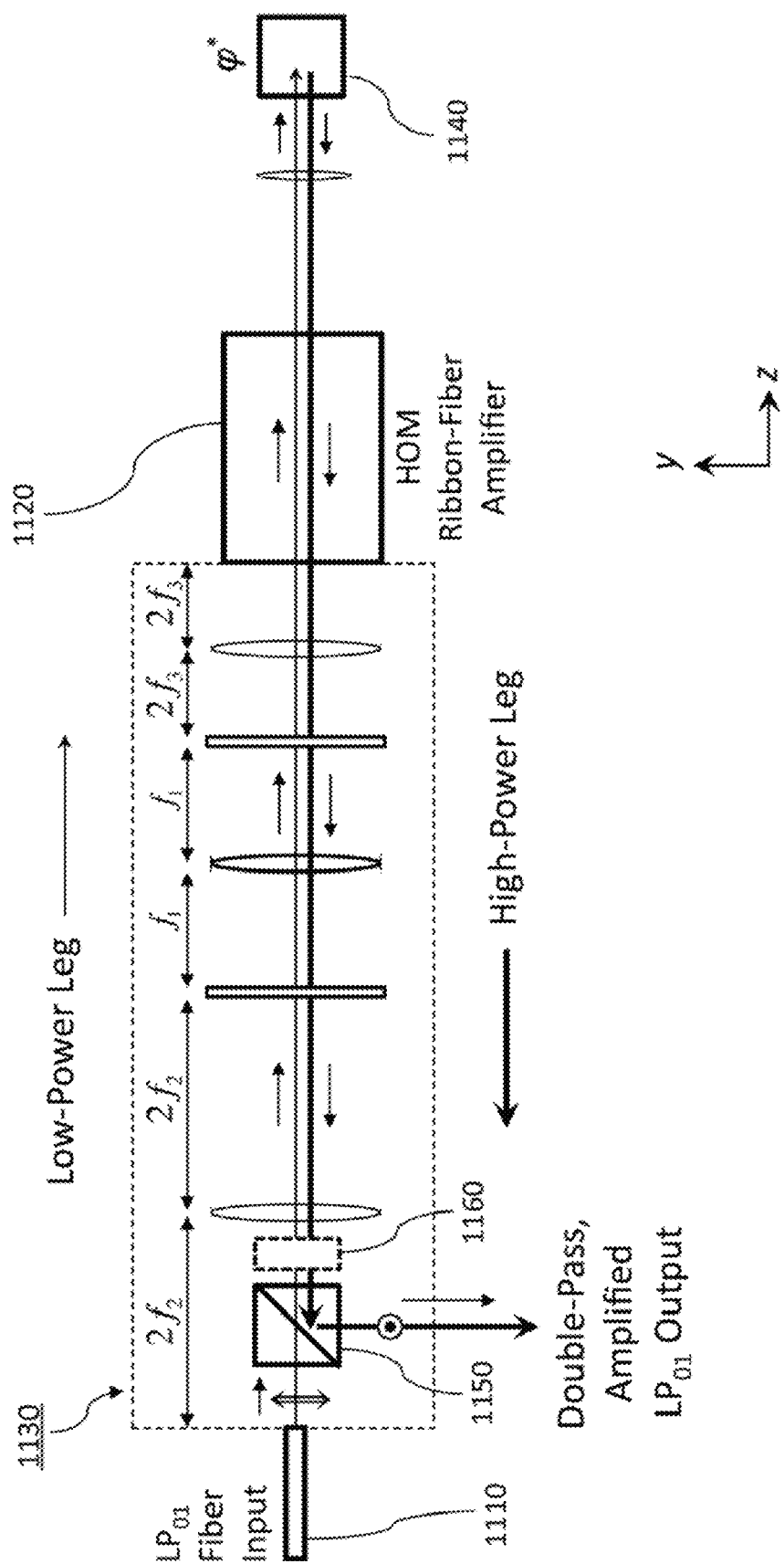
FIG. 11 shows a double-pass MOPA system with a mode converter, augmented with a phase-conjugate mirror to realize real-time adaptive optical compensation.

Turning now to FIG. 11, an alternate compensated MOPA embodiment is depicted, referred to in the art as a phase-conjugate MOPA system. This architecture can provide real-time compensation for system aberrations and coupling inefficiencies (both static and dynamic distortions). Note that this embodiment involves a double-pass configuration, whereby the forward-going, amplified HOM mode is wavefront-reversed by a phase-conjugate mirror, and, in the process, retraces its path, thereby traversing the ribbon fiber amplifier in a reverse sequence. The basic system elements are similar to those depicted in FIG. 10, including the low-power oscillator 1110, a mode-conversion module 1130, and a HOM power amplifier 1120. Note that, in this case, only a single mode-converter module 1130 is required, as the beam will double-pass all the system components. In this configuration, the amplified, forward-going ribbon fiber output beam is directed to a phase conjugate mirror (PCM) 1140. PCMs are well-known in the art, and function via a variety of nonlinear optical mechanisms (stimulated scattering interactions, optical parametric interactions, photorefractive mechanisms, thermal gratings, etc.). The specific choice of PCM is dependent upon myriad system parameters, including response time, power scaling, wavelength, frequency shift considerations, polarization, etc. Those well-skilled in the art are familiar with these and related issues; so, additional design details that pertain to the PCM and its implementation will be relegated to the systems design community.

Suffice it to say that the wavefront-reversed beam, upon its reverse passage through the optical system, essentially "undoes" the distortions encountered on its initial transit (fiber distortions and mode mixing, optical imperfections, depolarization, etc.). In addition, the HOM that emerges from the amplifier 1120, will, as a result of the "time-reversed" nature of the PCM, precisely couple back into the HOM ribbon fiber in its reverse propagation trajectory. Moreover, this embodiment compensates for imperfections in the mode converter module that would otherwise limit the overall efficiency of the system.

The backward-going bean after reverse transit back through the HOM fiber and mode converter, can be out-coupled from the system using various well-known mechanisms, such as polarization decoupling, non-reciprocal methods (e.g., Faraday rotation techniques), and others, which are also well-known to the skilled artesian. In FIG. 11, an example is shown that utilizes a Faraday rotator 1160, in conjunction with a polarization sensitive beam splitter 1150, such as a Glan prism, to direct the high-power, double-passed diffraction-limited beam out from the system. A quarter-wave plate, in conjunction with a Glan prism is another example to enable efficient out-coupling of the double-pass beam (in this case, polarization considerations may apply, as is well-known).

Figure 12:
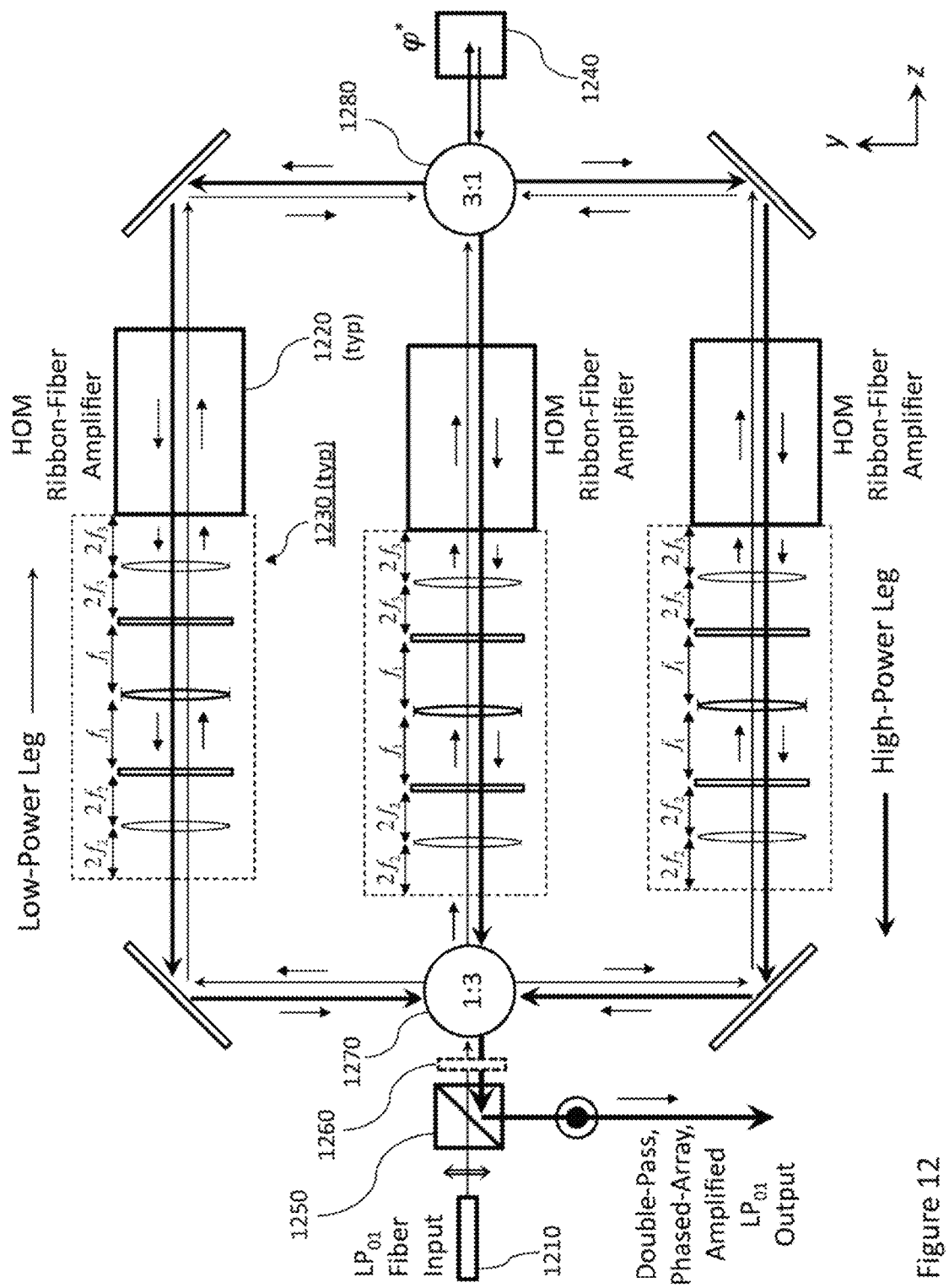
FIG. 12 shows a double-pass phase-conjugate MOPA system as in FIG. 11, augmented for phased-array power scaling using an ensemble of ribbon fiber amplifiers, cascaded in parallel.

FIG. 12 depicts a phase-conjugate MOPA, with a similar configuration relative to that of FIG. 11. This embodiment enables power scaling to higher powers, which, in the case of a single ribbon fiber, may otherwise be limited. The basic system builds upon the single-HOM power amplifier configuration of FIG. 11 by augmenting the system with a series/parallel cascaded network of ribbon fiber power amplifiers (three amplifiers, in this example). The seed laser 1210 in FIG. 12 is partitioned into three beams using a 1:3 beam splitter/combiner 1270. Each beam is then directed into a dedicated mode-converter 1230, followed by an associated HOM power amplifier 1220. The set of three amplified output beams are then recombined using a three-way beam splitter/combiner 1280 aligned in a 3:1 configuration (in reverse, relative to the other splitter 1270). The resultant beam is directed into a PCM 1240. The wavefront-reversed replica retraces its trajectory, with all the beam paths precisely retraced. The action of the PCM effectively compensates for differential phase shifts amongst the three amplifier legs, with the result that the PC-MOPA functions as a phased-array, multiple amplifier system. As in FIG. 11, the composite, diffraction-limited, high-power beam is out-coupled from the system using similar techniques, such as via a Faraday rotator 1260 and a Glan prism 1250.

Note that, in the case wherein the 3:1 beam splitter/combiner 1280 functions optimally with low-order spatial modes (as opposed to HOMs), each ribbon-fiber output, on its forward-going transit, can be directed into a dedicated mode converter (analogous to module 1040 shown in FIG. 10). In this manner, each ribbon fiber HOM output beam will be transformed to a $TEM_{00}$ mode prior to impinging onto the 3:1 beam splitter/combiner 1280.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain, the principles of the invention and its practical application to thereby enable others skilled in the art to best use the invention in various embodiments and with various modifications suited to the particular use contemplated. The scope of the invention is to be defined by the following claims.

We claim:

1. An apparatus, comprising:
    a HOM ribbon fiber amplifier configured to receive and amplify a higher order mode (HOM) input beam to produce an amplified HOM beam;
    a first diffractive optical element (DOE) configured to impart a predetermined phase onto said amplified HOM beam to produce an amplified fundamental mode beam; and
    a second DOE configured to transform the phase of said amplified fundamental mode beam into a single fundamental mode beam.

2. The apparatus of claim 1, wherein said first DOE comprises a first phase plate and wherein said second DOE comprises a second phase plate.

3. The apparatus of claim 1, wherein said first phase plate is configured to impart the requisite amount of phase shift across said amplified HOM beam to produce said amplified fundamental mode beam that is spread into multiple lobes matching the spatial pattern of said amplified HOM beam and wherein said second phase plate is configured to produce a single Gaussian beam from said amplified fundamental mode beam.

4. The apparatus of claim 1, wherein said HOM ribbon fiber amplifier comprises a core having a first width configured to propagate a single mode and a second width orthogonal to said first width, wherein said second width is configured to propagate multiple modes or beams.

5. A method, comprising:
    providing an apparatus comprising:
        a HOM ribbon fiber amplifier configured to receive and amplify a higher order mode (HOM) input beam to produce an amplified HOM beam;
        a first diffractive optical element (DOE) configured to impart a predetermined phase onto said amplified HOM beam to produce an amplified fundamental mode ($TEM_{00}$) amplitude profile; and
        a second DOE configured to transform the phase of said amplified amplitude profile into a single fundamental mode ($TEM_{00}$) beam;
    directing said higher order mode (HOM) input beam into said HOM ribbon fiber amplifier to produce said amplified HOM beam;
    directing said amplified HOM beam onto said first DOE to produce said amplified fundamental mode ($TEM_{00}$) amplitude profile; and
    directing said amplified fundamental mode beam onto said second DOE to produce said single fundamental mode ($TEM_{00}$) beam.

6. The method of claim 5, wherein said first DOE comprises a first phase plate and wherein said second DOE comprises a second phase plate.

7. The method of claim 5, wherein said first phase plate is configured to impart the requisite amount of phase shift across said amplified HOM beam to produce said $TEM_{00}$ amplitude profile at the input plane of said second DOE, wherein said second DOE is configured to produce a $TEM_{00}$ mode beam from said amplified $TEM_{00}$ amplitude profile.

8. The method of claim 5, wherein said HOM ribbon fiber amplifier comprises a core having a first width configured to propagate a single mode and a second width orthogonal to said first width, wherein said second width is configured to propagate multiple modes or beams.

* * * * *